(12) United States Patent
Nanavati et al.

(10) Patent No.: US 6,754,651 B2
(45) Date of Patent: Jun. 22, 2004

(54) MINING OF GENERALIZED DISJUNCTIVE ASSOCIATION RULES

(75) Inventors: Amit Anil Nanavati, New Delhi (IN); Krishna Prasad Chitrapura, New Delhi (IN); Sachindra Joshi, New Delhi (IN); Raghuram Krishnapuram, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 09/836,118

(22) Filed: Apr. 17, 2001

(65) Prior Publication Data

US 2002/0152201 A1 Oct. 17, 2002

(51) Int. Cl.$^7$ ............................................. G06F 17/30
(52) U.S. Cl. ............................. 707/3; 707/2; 707/10; 707/12; 707/102; 707/104.1
(58) Field of Search .................... 705/10, 1, 3, 7, 705/51; 706/12, 47, 42, 4, 8, 10, 13, 21, 25, 45, 46, 52, 59, 60; 707/3, 6, 12, 104.1, 2, 10, 102; 438/118; 709/213, 244, 248, 250, 400

(56) References Cited

U.S. PATENT DOCUMENTS

| | | | |
|---|---|---|---|
| 5,615,341 A | | 3/1997 | Agrawal et al. |
| 5,638,493 A | * | 6/1997 | Ballard ........................ 706/46 |
| 5,794,209 A | | 8/1998 | Agrawal et al. |
| 5,933,818 A | * | 8/1999 | Kasravi et al. ............... 706/12 |
| 6,003,029 A | * | 12/1999 | Agrawal et al. ............... 707/7 |
| 6,171,109 B1 | * | 1/2001 | Ohsuga ........................ 434/118 |
| 6,311,173 B1 | * | 10/2001 | Levin et al. ................... 706/21 |
| 6,490,582 B1 | * | 12/2002 | Fayyad et al. ................. 707/6 |
| 6,523,020 B1 | * | 2/2003 | Weiss ........................... 706/47 |
| 2003/0055707 A1 | * | 3/2003 | Busche et al. ................. 705/10 |

OTHER PUBLICATIONS

R. Agrawal, T. Imielinski, A. Swami, "Mining Association Rules between sets of items of Large Databases", Proc. of ACM SIGMOD Conf. on Management of Dat, 207–216.
R. Srikant and R. Agrawal, "Mining Generalized Association Rules", Proc. of the 21st VLDB Conf. Zurich, Switzerland, 1995.
R. Srikant, Q. Vu, R. Agrawal, "Mining Association Rules with Item Constraints", AAAI, 1997.

* cited by examiner

Primary Examiner—Shahid Alam
Assistant Examiner—Fred Ehichioya
(74) Attorney, Agent, or Firm—McGinn & Gibb, PLLC; T. Rao Coca

(57) ABSTRACT

The present invention provides a system and a method for mining a new kind of association rules called disjunctive association rules, where the antecedent or the consequent of a rule may contain disjuncts of terms (X∨Y or X⊕Y). Such rules are a natural generalisation to the kind of rules that have been mined hitherto. Furthermore, disjunctive association rules are generalised in the sense that the algorithm also mines rules which have disjunctions of conjuncts (C⇒(A∧B)∨(D∧E)). Since the number of combinations of disjuncts is explosive, we use clustering to find a generalized subset. The said clustering is preferably performed using agglomerative clustering methods for finding the greedy subset.

42 Claims, 5 Drawing Sheets

A⊕B => C

C =>A⊕B

A∨B => C

C => A∨B

Let Set S — {all two items (A,B) such that |A ∩ B| > *minsupp*}
S form the rules of form A => B Candidate Set CS => {all two items (A,B) such that |A ∩ B| < *minsupp*}
while CB is not empty
    for all (A, B) (C, B) in CS
        if |(A ∨ C, B)| > *minsupp*
            add(A ∨ C, B) to S
    else
        add(A ∨ C, B) to new candidate set $CS_1$
        add(A , B) and (C, B) also to $CS_1$
    for all (A, B) (A, C) in CS
        if |(A, B ∨ C)| > *minsupp*
            add(A, B ∨ C) to S
    else
        add(A, B ∨ C) to new candidate set $CS_1$
        add(A, B) and (A, C) also to $CS_1$
$CS = CS_1$

FIG.3

MINING OF GENERALIZED DISJUNCTIVE ASSOCIATION RULES

FIELD OF THE INVENTION

The present invention relates to mining of generalized disjunctive association rules. It relates generally to data processing, and more particularly to "computer database mining" in which association rules are discovered. In particular, this invention introduces the concept of a disjunctive association rule, a generalized disjunctive association rule and provides an efficient way to compute them.

BACKGROUND OF THE INVENTION

Let $I=\{i_1, i_2 \ldots, i_m\}$ be a set of literals, called items. Let D be a set of transactions where each transaction t is a subset of the set of items I. We say that a transaction t contains X ($X \subseteq I$), if $X \subseteq t$. We use T(X) to denote the set of all transactions that contain X. An association rule is an implication of the form $X \Rightarrow Y$, where $X \subset I$, $Y \subset I$ and $X \cap Y = \phi$. The rule $X \Rightarrow Y$ holds in the transaction set D with confidence c if c % of transactions in L that contain X also contain Y. The rule $X \Rightarrow Y$ has support s in the transaction set if s% of transactions in D contain X 4 Y. Given a set of transactions D, the problem of mining association rules is to generate all association rules that have support and confidence "greater than the user-specified minimum support (minsupp) and minimum confidence (minconf) respectively [1,2,3]. In what follows, we use 'item' and 'attribute' interchangeably.

Mining algorithms have received considerable research attention. In one approach [2] the authors take into account the taxonomy (is-a hierarchy) on the items, and find associations between items at any level of the taxonomy. For example, given a taxonomy that says that jackets is-a outerwear is-a clothes, we may infer a rule that "people who buy outerwear tend to buy shoes". This rule may hold even if rules that "people who buy jackets tend to buy shoes", and "people who buy clothes tend to buy shoes" do not hold. Users are often interested only in a subset of association rules. For example, they may only want rules that contain a specific item or rules that contain children of a specific item in a hierarchy. In [3], the authors consider the problem of integrating constraints that are boolean expressions over the presence or absence of items into the association discovery algorithm.

Instead of applying these constraints as a post-processing step, the integrate constraints into the algorithm, which reduces the execution time.

So far, knowledge discovery in data mining has focussed on association rules with conjuncts ($A \wedge B \rightarrow X \wedge Y$) only. Specifically, traditional association rules cannot capture contextual inter-relationships among attributes.

U.S. Pat. Nos. 5,794,209 and 5,615,341 describe a system and method for discovering association rules by comparing the ratio of the number of times each itemset appears in a dataset to the number of time particular subsets of the itemset appear in the database, in relation to a predetermined minimum confidence value. The specified system and method however are limited in the use of operators for defining the association rules. Logical completeness of association rule discovery requires a functionally complete set of operators ([$\wedge$ (and), $\vee$ (or), $\neg$(not)], [$\oplus$(xor), $\neg$].

Furthermore, the method does not utilize contextual information to define the association rules and is therefore limited in the effectiveness of the result. U.S. Pat. No. 5,615,341 is further limited by the use of hierarchical taxonomies in the determination of the association rules.

THE OBJECT AND SUMMARY OF THE INVENTION

The object of this invention is to provide a system and method for mining a new kind of rules called disjunctive association rules for analyzing data and discovering new kind of relationships between data items.

Another object of the present invention is to incorporate the $\vee$, $\wedge$, as well as the $\oplus$ operators in the discovery of the disjunctive association rules.

To achieve the said objective this invention provides A method for mining data characterized in that it generates generalized disjunctive association rules to capture the relationships between data items with reference to a given context to provide improved data analysis independently of taxonomies, comprising the steps of:

- generating a list of all possible data items that can influence said context,
- discovering association rules for data items in said that co-occur based on a defined overlap threshold within said context,
- clustering said data items to form a set of generalized disjunctive rules based on a defined confidence (and/or support) threshold, and
- iterating the above steps until all items in said list are covered.

The said list is generated by selecting those data items that have a significant overlap with said context.

The said association rules are discovered by merging data items that overlap above said defined threshold within said context and confirmation that the strength of the relation is beyond a defined minimum support value.

The Clustering is agglomerative.

The discovery of said association rules uses a functionally complete set of operators including "AND", "OR", NOT" and "EXCLUSIVE-OR".

The above method is applied to clustering of query results in a search engine where the query is the context, a word is mapped to an item, a document to a transaction, the recall is the confidence, and the resulting disjuncts are the labels of the clusters of documents.

The said method is extended to interactive query refinement.

The above method is applied to customer targeting by determining generalized disjunctive association rules on data such as customer purchase history, customer segments, product information and the like.

The above method is further used for making recommendations to customers where the customer's purchase history is the context and the generalized disjunctive association rules provide the recommendations.

The above method is applied to gene analysis by finding the generalized disjunctive association rules from gene databases.

The instant method is applied to cause-and-effect analysis in applications such as medical analysis, market survey analysis and census analysis, by finding generalized disjunctive association rules from the database of causes and effects.

The method is applied to fraud detection by finding generalized disjunctive association rules from transaction databases.

The present invention further relates to a system for mining data characterized in that it generates generalized disjunctive association rules to capture the relationships between data items with reference to a given context to provide improved data analysis independently of taxonomies, comprising:

means for generating a list of all possible data, items that can influence said context, means for discovering association rules for data items in said list that co-occur based on a defined overlap threshold within said context, means for clustering said data items to form a set of generalized disjunctive rules based on a defined confidence (and/or support) threshold, and means for iterating the above steps until all items in said list are covered.

The said list is generated by means for selecting those data items that have a significant overlap with said context.

The said association rules are discovered by means for merging data items that overlap above said defined threshold within said context and confirmation that the strength of the relation is beyond a defined minimum support value.

The said clustering is agglomerative.

The discovery of said association rules uses a functionally complete set of operators including "AND", "OR", NOT" and "EXCLUSIVE-OR".

The above system is used for clustering of query results in a search engine where the query is the context, a word is mapped to an item, a document to al transaction, the recall is the confidence, and the resulting disjuncts are the labels of the clusters of documents.

The system is extended to interactive query refinement.

The said system is used for customer targeting by means for determining generalized disjunctive association rules on data such as customer purchase history, customer segments, product information and the like.

The said system is used for making recommendations to customers where the customer's purchase history is the context and the generalized disjunctive association rules provide the recommendations.

The above system is further used for gene analysis by means for finding the generalized disjunctive association rules from gene databases.

The above system is also used for cause-and-effect analysis in applications such as medical analysis, market survey analysis and census analysis, by means for finding generalized disjunctive association rules from the database of causes and effects.

The system is used for fraud detection by means for finding generalized disjunctive association rules from transaction databases.

The instant invention further provides a computer program product comprising computer readable program code stored on computer readable storage medium embodied therein for mining data characterized in that it generates generalized disjunctive association rules to capture the relationships between data items with reference to a given context to provide improved data analysis independently of taxonomies, comprising computer readable program code means configured for generating a list of all possible data items that can influence said context, computer readable program code means configured for discovering association rules for data items in said list that co-occur based on a defined overlap threshold within said context, computer readable program code means configured for clustering said data items to form a set of generalized disjunctive rules based on a defined confidence (and/or support) threshold, and computer readable program code means configured for iterating the above steps until all items in said list are covered.

The said list is generated by computer readable program code means configured for selecting those data items that have a significant overlap with said context.

The said association rules are discovered by computer readable program code means configured for merging data items that overlap above said defined threshold using traditional association rules within said context and confirmation that the strength of the relation is beyond a defined minimum support value.

The said clustering is agglomerative.

The discovery of said association rules uses a functionally complete set of operators including "AND", "OR", NOT" and "EXCLUSIVE-OR".

The above computer program product is configured for clustering of query results in a search engine where the query is the context, a word is mapped to an item, a document to a transaction, the recall is the confidence, and the resulting disjuncts are the labels of the clusters of documents.

The said computer program product is extended to interactive query refinement

The above computer program product is configured for customer targeting by computer readable program code means configured for determining generalized disjunctive association rules on data such as customer purchase history, customer segments, product information and the like.

The instant computer program product is configured for making recommendations to customers where the customer's purchase history is the context and the generalized disjunctive association rules provide the recommendations.

The computer program product is configured for gene analysis by computer readable program code means configured for finding the generalized disjunctive association rules from gene databases.

The above computer program product is configured for cause-and-effect analysis in applications such as medical analysis, market survey analysis and census analysis, by computer readable program code means configured for finding generalized disjunctive association rules from the database of causes and effects.

The instant computer program product is configured for fraud detection by computer readable program code means configured for finding generalized disjunctive association rules from transaction databases.

BRIEF DESCRIPTION OF THE DRAWINGS

The invention will now be described with reference to the accompanying drawings:

FIGS. (1a) to (1d) show four types of disjunctive rules.

FIG. 3 shows a brute force algorithm to generate all disjunctive association rules.

DETAILED DESCRIPTION OF THE DRAWINGS

FIG. 1 enumerates various types of intersections among attributes A, B, C and the kind of disjunctive association rules that arise from them. In these diagrams, C is the context which captures the relationship between A and B.

Figure 1B:
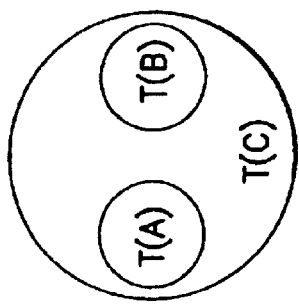
Figure 1D:
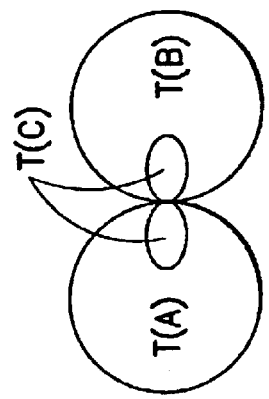
Figure 1A:
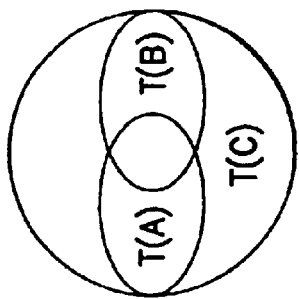
Figure 1C:
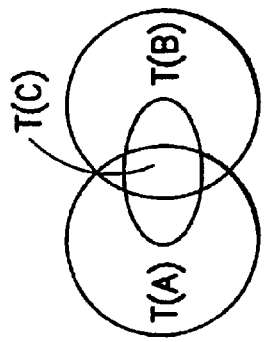

FIG. 1(c) describes the case where $T(C) \subseteq T(A) \cup T(B)$, which leads to rules of the form $C \Rightarrow A \lor B$. Note that $C \Rightarrow A \lor B$ can be true even if $C \Rightarrow A$ and $C \Rightarrow B$ are not (they may lack confidence and/or support and thus fail to become rules). Lowering the value of minimum support and/or minimum confidence may yield $C \Rightarrow A$ and $C \Rightarrow B$ as rules, but such lowering may lead to the discovery of trivial rules, and does not capture this particular disjunctive relationship between A and B with respect to C with the original level of confidence and support.

FIG. 1(d) shows the case where $T(C) \subseteq T(A) \cup T(B)$ such that A and B have no intersection.

FIG. 1(a) describes the case where $T(A) \cup T(B) \subseteq T(C)$ which means $A \lor B \Rightarrow C$.

Similarly, FIG. 1(b) denotes the exclusive-or relationship between A and B. Again, A and B may have a significant overlap outside C. Traditional association rules are incapable of expressing (discovering) such contextual relationships.

Figure 2:
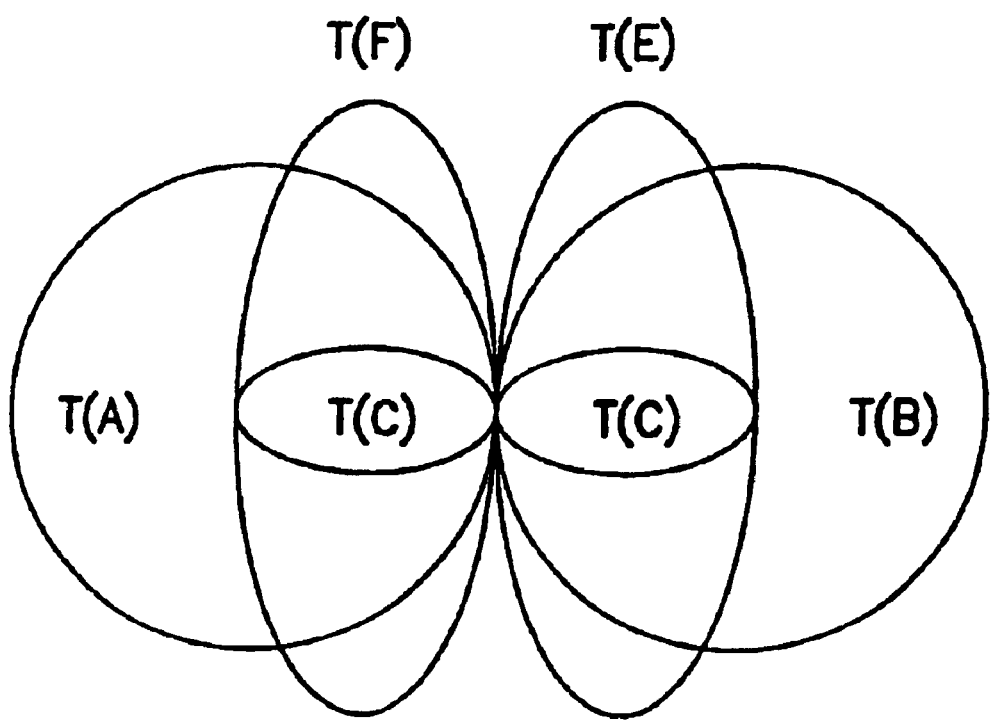
FIG. 2 shows an example of conjunctive overlap.

FIG. 2 shows the case where there may be a significant intersection (overlap) among attributes (A,B,E,F) with respect to C. It is easy to see that such conjunctive overlaps may occur in all the four kinds of rules in FIG. 1.

Definition 1: The support of a disjunctive rule is defined as the cardinality of the union of the disjunctive terms in the antecedent intersected with the union of the disjunctive terms in the consequent, divided by the total number of transactions. For example, support $(A \lor B \Rightarrow C)$=support$(C \Rightarrow A \lor B)$=$|[T(A) \cap T(B)] \cap T(C)|/|D|$ support $(A \oplus B \Rightarrow C)$ support$(C \Rightarrow A \oplus B)$=$|[T(A) \cup T(B) - T(A \cap B)] \cap T(C)|/|D|$.

$(A \oplus B \Rightarrow C)$ indicates that $|(T(A) \cap T(B) \cap T(C)|$.

Definition 2: The confidence of a disjunctive rule is defined as the cardinality of the union of the disjunctive terms in the antecedent intersected with the union of the disjunctive terms in the consequent, divided by the cardinality or the union of disjunctive terms in the antecedent. For example, confidence $(A \lor B \Rightarrow C)$=confidence$(A \oplus B \Rightarrow C)$=$|T(A) \cup T(B) \cap T(C)|/|[T(A) \cup T(B)]|$.

confidence $(C \Rightarrow A \lor B)$=confidence$(A \oplus B \Rightarrow C)$=$|[T(A) \cup T(B)] \cap T(C)|/|T(C)|$ Definition 3: A k-disjunctive rule is a rule that has at most k items in the antecedent or the consequent of a disjunctive rule: $A_1 \lor A_2 \lor \ldots \lor A_k \Rightarrow C$. A generated k-disjunctive rule is a k-disjunctive rule where each item in the antecedent (or consequent) $A_i$ can be a conjunction of terms $A_{i1} \land A_{i2} \land A_{im}$.

k is a user-defined threshold. Obviously, as opposed to traditional conjunctive rules, shorter disjunctive rules are more interesting than longer ones.

Definition 4: A context is any arbitrary subset (typically based on some criteria) of the set of transactions, D.

A natural choice for a context may be the subset of transactions that include item (attribute) $i \in I$ (as is typically done in traditional mining). A more general example could be the set of transactions done by a particular group of people who buy X, but not Y or Z. A context defines a subspace of interest to focus the search for rules. A context may be also be chosen based on the number of occurrences (minsupp). So, support can be used as a factor to prune the space of contexts. Such an approach would lead to finding generalised disjunctive association rules, which satisfy both minconf and minsupp. There may be applications where exceptional patterns (which lack support) are more interesting, for example, fraud detection, where the minsupp constraint is dropped.

We make the following observations with regard to disjunctive rules.

Observation 1 (subsumption) When $A \Rightarrow C$ we need not consider A as a disjunct in the antecedent for consequent C (nor C as a disjunct in the consequent for antecedent A) i.e. rules of the form $A \lor B \Rightarrow C$ and $A \Rightarrow B \lor C$. This is because $A \Rightarrow C$ is a stronger rule and automatically implies the disjunctive rules.

Observation 2 (interdependence) When $A \Rightarrow B$, we do not consider the disjunction of A and B, i.e., rules of the form $A \lor B \Rightarrow C$ as well as $C \Rightarrow A \lor B$ Since the relationship between A and B is known in the general case, it can be inferred even within the context. It is redundant to consider both together within the context of C.

Observation 3 (independence) When $|T(A) \cap T(C)| <$cutoff, we do not consider A as an antecedent or consequent for C, i.e. rules of the form $A \lor B \Rightarrow C$ and $C \Rightarrow A \lor B$. This indicates that the relationship between A and C is weak, and one only trivially supports the other. Eliminating such items prevents the generation of trivial rules (rules with a very large number of disjunctive antecedents or consequents).

The cutoff parameter is used to weed away trivial contributions in a disjunction. The value of cutoff may be determined by the user defined input parameter k. Since a rule may have at most k disjuncts, cutoff (minconf/k)*$|T(C)|$, where C is the context.

Observation 4 (vacuous tautology) When all the transactions in D contain a subset of items, then it is redundant to consider their influence on any context. These occurs when A and its negation ($\neg A$) are both attributes. In this case, every context $C \Rightarrow A \lor \neg A$.

The algorithm in FIG. 3 makes use of the above observations in pruning the search space. It is exhaustive and finds all generalised disjunctive rules. However, when the number of attributes is large, the above observations are not enough to prune the search space substantially. In such cases, we use agglomerative clustering to find a subset of the set of all generalised disjunctive rules (FIG. 4).

Algorithm GDAR

We detail a generalised disjunctive association rule (GDAR) mining algorithm which mines for rules with high confidence with respect to a given context. We emphasize that these relationships may not be valid given another context or outside the chosen one. In this sense, the algorithm finds 'local' relationships as opposed to the 'global' ones found by traditional mining algorithms.

Figure 4:
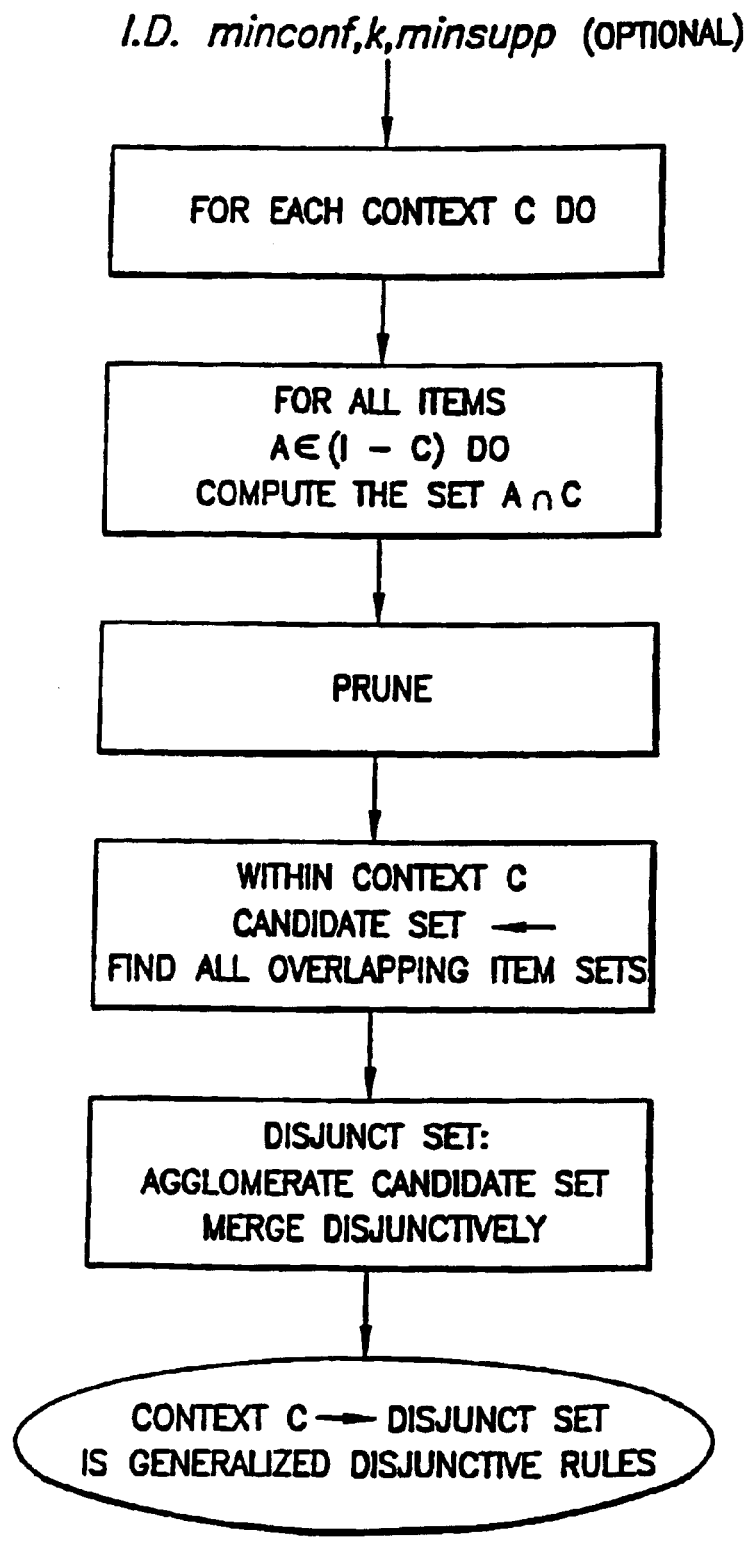
FIG. 4 shows a flowchart for Mining generalized Disjunctive Association Rules.

FIG. 4 shows the basic block diagram of the algorithm:
1. Given a context C, make a list of all possible items that can influence it. This list has items, which has significant overlap with the context. We get this by pruning the list based on the observations.
2. The next step involves merging items, which co-occur frequently within this context C. We merge such frequently co-occurring items to form conjuncts within the disjuncts. All items that have more than a user-specified (threshold) overlap are merged to form disjunctive units for the next step. This can also be done using traditional association rules [1] within the context, using appropriate values for support (observation 3) and a high value of confidence. For example, the rule $A \wedge B \Rightarrow C \wedge D$ leads to the conjunct $A \wedge B \wedge C \wedge D$ which could be a disjunct in a generalised disjunctive association rule.

3. The last step agglomerates over all pairs of conjunct terms of items in candidate set, to merge them into disjunct of conjuncts. The algorithm selects a pair of conjuncts A, B which has the highest confidence for $C \Rightarrow A \vee B$. If A and B are mutually exclusive (below another user-defined threshold e) in the context of C, we get $C \Rightarrow a \oplus B$. If the confidence is above a user specified threshold it becomes a rule otherwise the conjuncts are merged into $A \vee B$ ($A \oplus B$) and get added to the candidate list. The algorithm is iterated until no more pairs are left.

Some applications of this system and method are given below:

clustering of query results in search engines. A word is mapped to an item, and a document to a transaction. The query is the context, the k disjuncts are the labels of the clusters of documents. The recall is the confidence and ambiguity is related to k. The precision is inversely proportional to k. Reverse and forward indexing can be used for efficient word-to-document lookup and document-to-word lookup respectively. Each disjunct may be a word or a phrase (set of words).

The above method for clustering can also be extended for interactive query refinement, where a user's feedback about the relevance of the k clusters to his/her query is used to refine the query. For a query Q, and a selection P (where P is any generalised disjunctive set of terms), the refined query is $Q \wedge P$.

A method for customer targeting by finding generalised disjunctive association rules on customer purchase data, customer segments, and product information.

An offline method for product recommendation to customers, where the customer's purchase history is the context, and the k disjuncts are the recommendations.

An online method for product recommendation to customers, where the customer's current purchase is the context, and the items in the k disjuncts which the customer would not buy on his own initiative are recommended.

A method for gene analysis by finding generalised disjunctive association rules from gene databases.

An improved method for cause-and-effect analysis, when given a database of causes and occurrences, to find a relation among them. Examples of such databases include medical history, census, market survey.

A method for fraud detection by finding generalised disjunctive association rules from databases.

Advantages

The application of disjunctive association; rules is at least as widespread as those of traditional association rules. Generalised disjunctive association rules have important implications in the fields of ecommerce, information retrieval, database analysis.

Novel way of analysing data and discovering a new kind of relationship.

Introduction of a new kind of rules, disjunctive association rules (FIG. 1).

Further generalisation of disjunctive association rules (OR/XORs of conjuncts) (FIGS. 1,2).

Generalisation of the notion of a context (as detailed in definition 4).

Finding inter-relationships among attributes with respect to a context (FIGS. 1, 2).

An efficient method ($O(|I|^2)$) to mine generalised disjunctive association rules.

Figure 5:
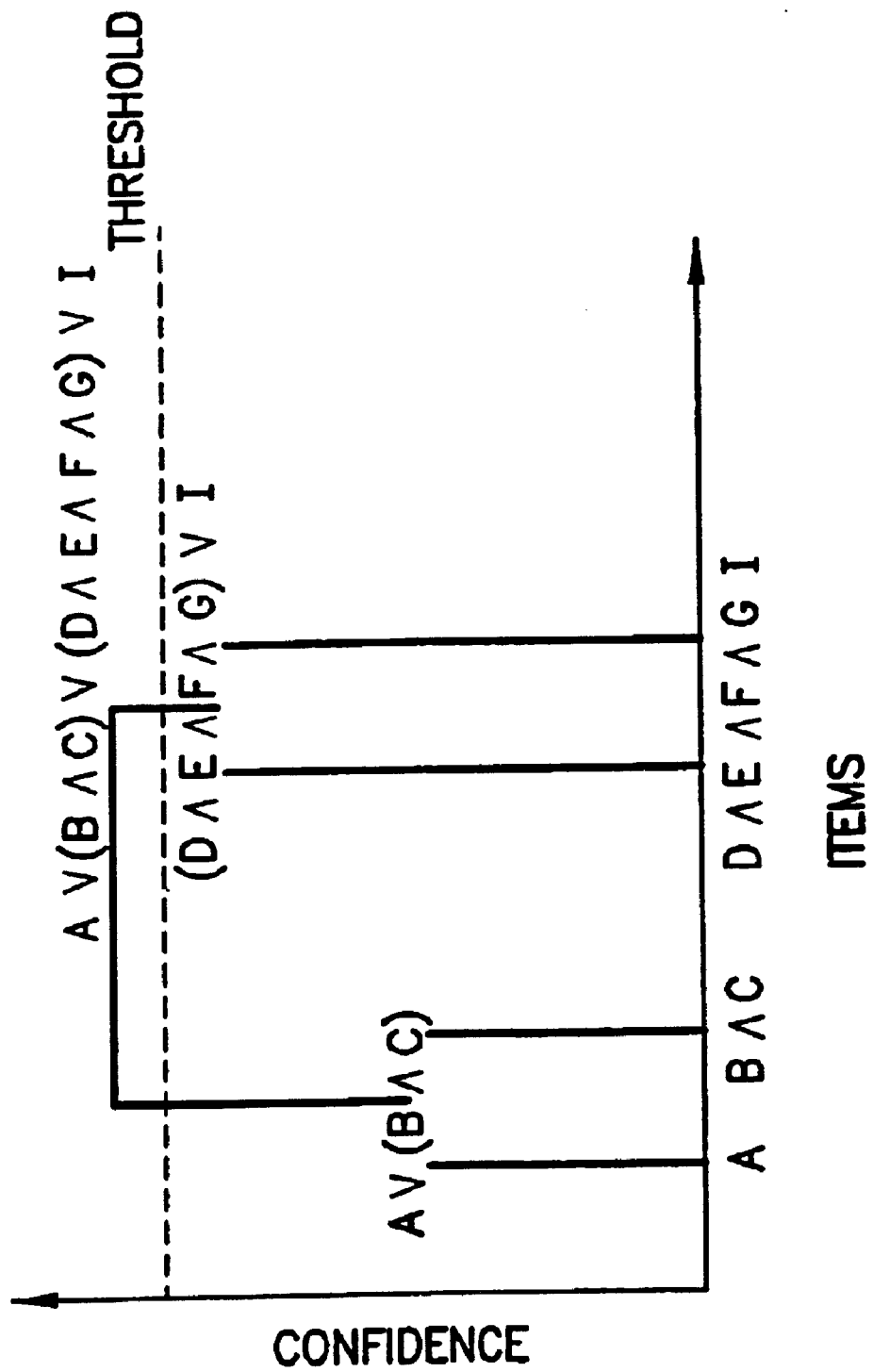
FIG. 5 shows agglomerating conjuncts disjunctively with respect to a context.

A novel use of agglomerative clustering to find such rules (FIGS. 4, 5).

Generalisation of the taxonomy [2] approach; this method finds rules that cannot be found by the taxonomy approach.

A taxonomy-free approach improves [2]; this method does: not require taxonomies.

References

1. R. Agrawal, T. Imielinski, A. Swami, "Mining Association Rules between sets of items in Large Databases", Proc. of ACM STGMOD Conf. on Management of Dat, 207–216.
2. R. Srikant and R. Agrawal, Mining Generalized Association Rules", Proc. of the 21st VLDB Conf. Zurich, Switzerland, 1995.
3. R. Srikant, Q. Vu, R. Agrawal, Mining Association Rules with Item Constraints", AAAI, 1997.

What is claimed is:

1. A method for mining data, wherein said method generates generalized disjunctive association rules to capture local relationships between data items with reference to a given context comprising any arbitrary subset of a set of transactions in order to provide improved data analysis independently of taxonomies, said method comprising:

generating a list of all possible data items that can influence said context, discovering disjunctive association rules for data items in said list that co-occur based on a defined overlap threshold within said context, using a cutoff parameter to eliminate trivial data items from said list, wherein said trivial data items create trivial disjunctive association rules having disjunctive antecedents or consequents greater than disjunctive antecedents or consequents of said disjunctive association rules occurring in said defined overlap threshold, clustering said data items to form a set of generalized disjunctive rules based on a defined confidence/support threshold, and iterating the above steps until all items in said list are covered.

2. The method as claimed in claim 1, wherein said list is generated by selecting those data items that have a significant overlap with said context.

3. The method as claimed in claim 1, wherein said disjunctive association rules are discovered by merging data items that overlap above said defined threshold within said context and confirmation that the strength of the relation is beyond a defined minimum support value.

4. The method as claimed in claim 3, wherein the discovery of said disjunctive association rules uses a functionally complete set of operators including "AND", "OR", NOT" and "EXCLUSIVE-OR".

5. The method as claimed in claim 1, wherein said clustering is agglomerative.

6. The method as claimed in claim 1, applied to clustering of query results in a search engine where the query is the context, a word is mapped to an item, a document to a transaction, the recall is the confidence, and the resulting disjuncts are the labels of the clusters of documents.

7. The method as claimed in claim 6 extended to interactive query refinement.

8. The method as claimed in claim 1, applied to customer targeting by determining generalized disjunctive association rules on data such as customer purchase history, customer segments, product information and the like.

9. The method as claimed in claim 1, used for making recommendations to customers where the customer's purchase history is the context and the generalized disjunctive association rules provide the recommendations.

10. The method as claimed in claim 1, applied to gene analysis by finding the generalized disjunctive association rules from gene databases.

11. The method as claimed in claim 1, applied to cause-and-effect analysis in applications such as medical analysis, market survey analysis and census analysis, by finding generalized disjunctive association rules from the database of causes and effects.

12. The method as claimed in claim 1, applied to fraud detection by finding generalized disjunctive association rules from transaction databases.

13. The method in claim 1, wherein support of a disjunctive rule is defined as the cardinality of the union of the disjunctive terms in the antecedent intersected with the union of the disjunctive terms in the consequent, divided by the total number of transactions.

14. The method in claim 1, wherein confidence of a disjunctive rule is defined as the cardinality of the union of the disjunctive terms in the antecedent intersected with the union of the disjunctive terms in the consequent, divided by the cardinality of the union of disjunctive terms in the antecedent.

15. A system for mining data, and operable for generalized disjunctive association rules to capture local relationships between data items with reference to a given context comprising any arbitrary subset of a set of transactions in order to provide improved data analysis independently of taxonomies, said system comprising:

means for generating a list of all possible data items that can influence said context, means for discovering disjunctive association rules for data items in said list that co-occur based on a defined overlap threshold within said context, means for using a cutoff parameter to eliminate trivial data items from said list, wherein said trivial data items create trivial disjunctive association rules having disjunctive antecedents or consequences greater than disjunctive antecedents or consequents of said disjunctive association rules occurring in said defined overlap threshold, means for clustering said data items to form a set of generalized disjunctive rules based on a defined confidence threshold, and means for iterating the above steps until all items in said list are covered.

16. The system as claimed in claim 15, wherein said list is generated by means for selecting those data items that have a significant overlap with said context.

17. The system as claimed in claim 15, wherein said disjunctive association rules are discovered by means for merging data items that overlap above said defined threshold within said context and confirmation that the strength of the relation is beyond a defined minimum support value.

18. The system as claimed in claim 17, wherein the discovery of said disjunctive association rules uses a functionally complete set of operators including "AND", "OR", NOT" and "EXCLUSIVE-OR".

19. The system as claimed in claim 15, wherein said clustering is agglomerative.

20. The system as claimed in claim 15, used for clustering of query results in a search engine where the query is the context, a word is mapped to an item, a document to a transaction, the recall is the confidence, and the resulting disjuncts are the labels of the clusters of documents.

21. The system as claimed in claim 20, extended to interactive query refinement.

22. The system as claimed in claim 15, used for customer targeting by means for determining generalized disjunctive association rules on data such as customer purchase history, customer segments, product information and the like.

23. The system as claimed in claim 15, used for making recommendations to customers where the customer's purchase history is the context and the generalized disjunctive association rules provide the recommendations.

24. The system as claimed in claim 15, used for gene analysis by means for finding the generalized disjunctive association rules from gene databases.

25. The system as claimed in claim 15, used for cause-and-effect analysis in applications such as medical analysis, market survey analysis and census analysis, by means for finding generalized disjunctive association rules from the database of causes and effects.

26. The system as claimed in claim 15, used for fraud detection by means for finding generalized disjunctive association rules from transaction databases.

27. The system in claim 15, wherein support of a disjunctive rule is defined as the cardinality of the union of the disjunctive terms in the antecedent intersected with the union of the disjunctive terms in the consequent divided by the total number of transactions.

28. The system in claim 15, wherein confidence of a disjunctive rule is defined as the cardinality of the union of the disjunctive terms in the antecedent intersected with the union of the disjunctive terms in the consequent, divided by the cardinality of the union of disjunctive terms in the antecedent.

29. A computer program product comprising computer readable program code stored on computer readable storage medium embodied therein for mining data, wherein said method generates generalized disjunctive association rules to capture local relationships between data items with reference to a given context comprising any arbitrary subset of a set of transactions in order to provide improved data analysis independently of taxonomies, said computer program product comprising:

computer readable program code means configured for generating a list of all possible data items that can influence said context, computer readable program code means configured for discovering disjunctive association rules for data items in said list that co-occur based on a defined overlap threshold within said context, computer readable program code means configured for using a cutoff parameter to eliminate trivial data items from said list wherein said trivial data items create trivial disjunctive association rules having disjunctive antecedents or consequents greater than disjunctive antecedents or consequents of said disjunctive association rules occurring in said defined overlap threshold, computer readable program code means configured for clustering of said data items to form a set of generalized disjunctive rules based on a defined confidence threshold, and computer readable program code means configured for iterating the above steps until all items in said list are covered.

30. The computer program product as claimed in claim 29, wherein said list is generated by computer readable program code means configured for selecting those data items that have a significant overlap with said context.

31. The computer program product as claimed in claim 29, wherein said disjunctive association rules are discovered by computer readable program code means configured for merging data items that overlap above said defined threshold using traditional association rules within said context and confirmation that the strength of the relation is beyond a defined minimum support value.

32. The computer program product as claimed in claim 31, wherein the discovery of said disjunctive association rules uses a functionally complete set of operators including "AND", "OR", NOT" and "EXCLUSIVE-OR".

33. The computer program product as claimed in claim 29, wherein said clustering is agglomerative.

34. The computer program product as claimed in claim 29, configured for clustering of query results in a search engine where the query is the context, a word is mapped to an item, a document to a transaction, the recall is the confidence, and the resulting disjuncts are the labels of the clusters of documents.

35. The computer program product as claimed in claim 34 is extended to interactive query refinement.

36. The computer program product as claimed in claim 29, configured for customer targeting by computer readable program code means for determining generalized disjunctive association rules on data such as customer purchase history, customer segments, product information and the like.

37. The computer program product as claimed in claim 29, configured for making recommendations to customers where the customer's purchase history is the context and the generalized disjunctive association rules provide the recommendations.

38. The computer program product as claimed in claim 29, configured for gene analysis by computer readable program code means for finding the generalized disjunctive association rules from gene databases.

39. The computer program product as claimed in claim 29, configured for cause-and-effect analysis in applications such as medical analysis, market survey analysis and census analysis, by computer readable program code means for finding generalized disjunctive association rules from the database of causes and effects.

40. The computer program product as claimed in claim 29, configured for fraud detection by computer readable program code means for finding generalized disjunctive association rules from transaction databases.

41. The computer program product in claim 29, wherein support of a disjunctive rule is defined as the cardinality of the union of the disjunctive terms in the antecedent intersected with the union of the disjunctive terms in the consequent, divided by the total number of transactions.

42. The computer program product in claim 29, wherein confidence of a disjunctive rule is defined as the cardinality of the union of the disjunctive terms in the antecedent intersected with the union of the disjunctive terms in the consequent, divided by the cardinality of the union of disjunctive terns in the antecedent.

* * * * *